United States Patent
Levy

(10) Patent No.: US 7,802,049 B2
(45) Date of Patent: Sep. 21, 2010

(54) LINKS HAVING FLEXIBLE LANE ALLOCATION

(75) Inventor: Paul S. Levy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 10/284,847

(22) Filed: Oct. 30, 2002

(65) Prior Publication Data

US 2004/0088469 A1    May 6, 2004

(51) Int. Cl.
G06F 13/00    (2006.01)
G06F 5/00    (2006.01)
G06F 3/00    (2006.01)
G06F 13/36    (2006.01)
G06F 13/362    (2006.01)
H04L 12/28    (2006.01)

(52) U.S. Cl. .............. 710/316; 710/29; 710/52; 710/117; 710/306; 370/389; 370/412

(58) Field of Classification Search .......... 710/52, 710/316, 306, 29, 117, 72, 73, 71, 302, 66, 710/36; 370/389, 412, 395; 715/812, 815
See application file for complete search history.

(56) References Cited

U.S. PATENT DOCUMENTS

| | | | | |
|---|---|---|---|---|
| 5,193,087 A * | 3/1993 | Lichtash et al. | ............ | 370/360 |
| 5,383,183 A * | 1/1995 | Yoshida | ............ | 370/355 |
| 5,408,231 A * | 4/1995 | Bowdon | ............ | 340/2.22 |
| 5,430,442 A * | 7/1995 | Kaiser et al. | ............ | 340/2.26 |
| 5,513,322 A * | 4/1996 | Hou | ............ | 709/243 |
| 5,619,497 A * | 4/1997 | Gallagher et al. | ............ | 370/394 |
| 5,625,563 A * | 4/1997 | Rostoker et al. | ............ | 716/2 |
| 5,734,843 A * | 3/1998 | Gephardt et al. | ............ | 710/107 |
| 5,838,681 A * | 11/1998 | Bonomi et al. | ............ | 370/395.41 |
| 6,138,185 A * | 10/2000 | Nelson et al. | ............ | 710/33 |
| 6,145,024 A * | 11/2000 | Maezawa et al. | ............ | 710/14 |
| 6,317,804 B1 * | 11/2001 | Levy et al. | ............ | 710/305 |
| 6,501,761 B1 * | 12/2002 | Pannell et al. | ............ | 370/403 |
| 6,549,540 B1 * | 4/2003 | Ward | ............ | 370/412 |
| 6,611,518 B1 * | 8/2003 | Ngo et al. | ............ | 370/386 |
| 6,681,295 B1 * | 1/2004 | Root et al. | ............ | 711/128 |
| 6,694,382 B1 * | 2/2004 | Kovalan et al. | ............ | 710/5 |
| 6,754,757 B1 * | 6/2004 | Lewis | ............ | 710/301 |
| 6,760,793 B2 * | 7/2004 | Kelley et al. | ............ | 710/52 |
| 6,865,231 B1 * | 3/2005 | Bunton et al. | ............ | 375/246 |
| 6,870,838 B2 * | 3/2005 | Dally | ............ | 370/369 |
| 6,961,347 B1 * | 11/2005 | Bunton et al. | ............ | 370/465 |
| 6,988,161 B2 * | 1/2006 | McConnell et al. | ............ | 710/316 |

(Continued)

OTHER PUBLICATIONS

AMD, HyperTransport Technology I/O Link, Jul. 20, 2001.*
Nick Stam, Buses and Interconnects: Where from Here? Jul. 22, 2002,www.extremetech.com.*

(Continued)

Primary Examiner—Mark Rinehart
Assistant Examiner—Christopher A Daley
(74) Attorney, Agent, or Firm—Blakely, Sokoloff, Taylor & Zafman LLP

(57) ABSTRACT

Machine-readable media, methods, and apparatus are described for flexibly establishing lanes of links. In some embodiments, any port of a device may be connected to another port of another device. Further, the device may determine interconnections of its ports to ports of other devices by issuing requests on its ports.

30 Claims, 10 Drawing Sheets

U.S. PATENT DOCUMENTS

| | | | |
|---|---|---|---|
| 6,996,650 B2* | 2/2006 | Calvignac et al. | 710/305 |
| 7,031,305 B1* | 4/2006 | Yu et al. | 370/389 |
| 7,085,875 B1* | 8/2006 | Yona et al. | 710/307 |
| 7,167,481 B2* | 1/2007 | Steele et al. | 370/413 |
| 7,230,908 B2* | 6/2007 | Vanderaar et al. | 370/203 |
| 7,380,025 B1* | 5/2008 | Riggins et al. | 710/8 |
| 2003/0012182 A1* | 1/2003 | Sato | 370/352 |
| 2003/0081391 A1* | 5/2003 | Mowery et al. | 361/764 |
| 2003/0120852 A1* | 6/2003 | McConnell et al. | 710/316 |
| 2003/0188071 A1* | 10/2003 | Kunjan et al. | 710/305 |
| 2003/0217221 A1* | 11/2003 | Naffziger et al. | 710/316 |
| 2003/0225735 A1* | 12/2003 | Weber | 707/1 |
| 2004/0019726 A1* | 1/2004 | Kelley et al. | 710/305 |
| 2004/0019729 A1* | 1/2004 | Kelley et al. | 710/306 |
| 2004/0042448 A1* | 3/2004 | Lebizay et al. | 370/362 |
| 2005/0050230 A1* | 3/2005 | Vo | 710/1 |

OTHER PUBLICATIONS

Leon Erlanger, High-Performance Buses and Interconnects, Nov. 8, 2001, www.extremetech.com.*

PCI Express, PCI-SIG PCI Express™ Frequently Asked Questions Jul. 24, 2002, pp. 1-4.

$3^{RD}$ Generation I/O, Ajay V. Bhatt, Technology and Research Labs, Intel Corporation, Creating A Third Generation I/O Interconnect, pp. 1-8.

PCI, Express, PCI Express™ Base Specification Revision 1.0, Jul. 22, 2002, pp. 1-422.

* cited by examiner

LINKS HAVING FLEXIBLE LANE ALLOCATION

BACKGROUND

PCI (Peripheral Component Interconnect) Express is a high performance, general purpose I/O Interconnect defined for a wide variety of future computing and communication platforms. PCI Express maintains key PCI attributes, such as its usage model, load-store architecture, and software interfaces. PCI Express supports links between chips that may comprise x1, x2, x4, x8, x12, x16, or x32 lanes, and requires chips to support at least x1 links leaving chips to optionally support the other link widths. Further, PCI Express requires port interconnections between chips to be matched with some limited reordering. For example, chip A may support a x4 link using its ports 1-4, and chip B may support a x4 link using its ports 1-4. To create a x4 link between chip A and chip B, chip A ports 1-4 may be coupled respectively to chip B ports 1-4. PCI Express also indicates devices may optionally support lane reversal which allows for example chip A ports 1-4 to be respectively coupled to chip B ports 4-1. For further information regarding PCI Express, refer to PCI Express Base Specification Revision 1.0, Jul. 22, 2002 which may by obtained from the PCI-SIG at http://www.pcisig.org.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for establishing links comprising one or more lanes between devices. In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present invention. However, the invention may be practiced without such specific details. In other instances, control structures, gate level circuits and full software instruction sequences may not be shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
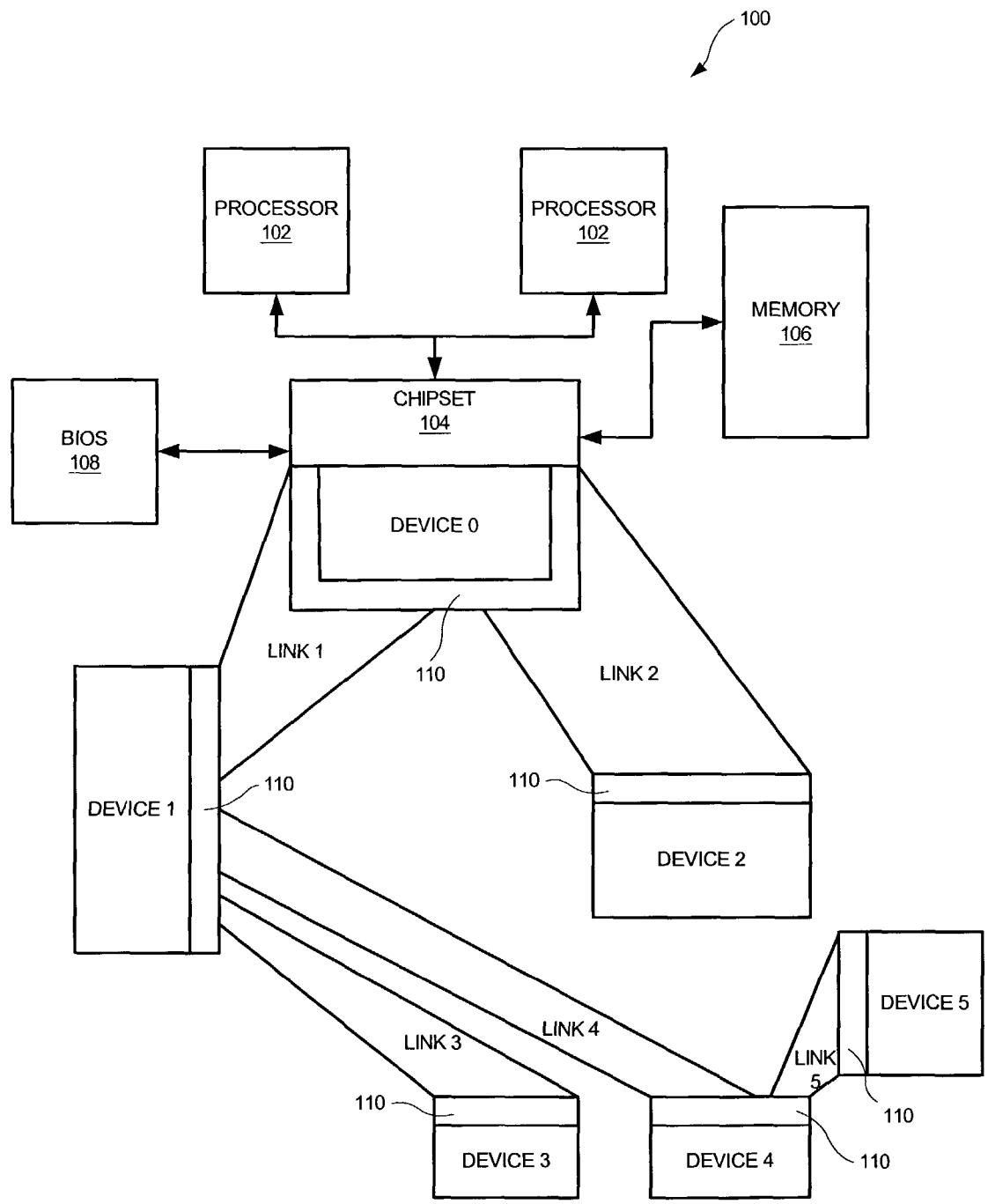
FIG. 1 illustrates an embodiment of a computing device.

An example embodiment of a computing device 100 is shown in FIG. 1. The computing device 100 may comprise one or more processors 102 coupled to a chipset 104. The chipset 104 generally interconnects the processor 102 to memory 106 and other components (e.g. a mouse, keyboard, video controller, hard disk, floppy disk, firmware, etc.) via one or more packaged integrated circuit devices or chips. The memory 106 may comprise memory devices that provide addressable storage locations. The memory devices may comprise dynamic random access memory (DRAM) devices, synchronous DRAM (SDRAM) devices, double data rate (DDR) SDRAM devices, quad data rate (QDR) SDRAM devices, or other volatile or non-volatile memory devices.

The computing device 100 may further comprise BIOS firmware 108 that provides instructions and routines that may be executed by the processor 102. In general, the routines provided by the BIOS 108 are used to access and initialize components of the computing device 100 prior to executing an operating system of the computing device 100. However, in some embodiments, the computing device 100 may execute the BIOS 108 routines to perform tasks even after invoking execution of the operating system.

The computing device 100 may comprise one or more devices (DEVICES 1-5) such as for example, Ethernet cards, video cards, RAID controllers, SCSI Controllers, ATA disk controllers, PCI bridges, etc coupled to a root device (DEVICE 0) of the chipset 104. The DEVICES 0-5 may comprise device interfaces 110 that interconnect the DEVICES 0-5 to form a device tree or device hierarchy. In one embodiment, device interfaces 110 provide a point-to-point, scalable, serial interface that supports PCI attributes such as, for example, PCI load-store architecture and PCI software interfaces.

FIG. 1 depicts a single device tree or hierarchy that includes a root device (DEVICE 0), two bridge devices (DEVICES 1 and 4), and three leaf devices (DEVICES 2, 3 and 5). The depicted device hierarchy, however, is merely illustrative. Other embodiments of the computing device 100 may comprise a different number of root devices, a different number of bridge devices, and/or a different number of leaf devices.

Figure 2:
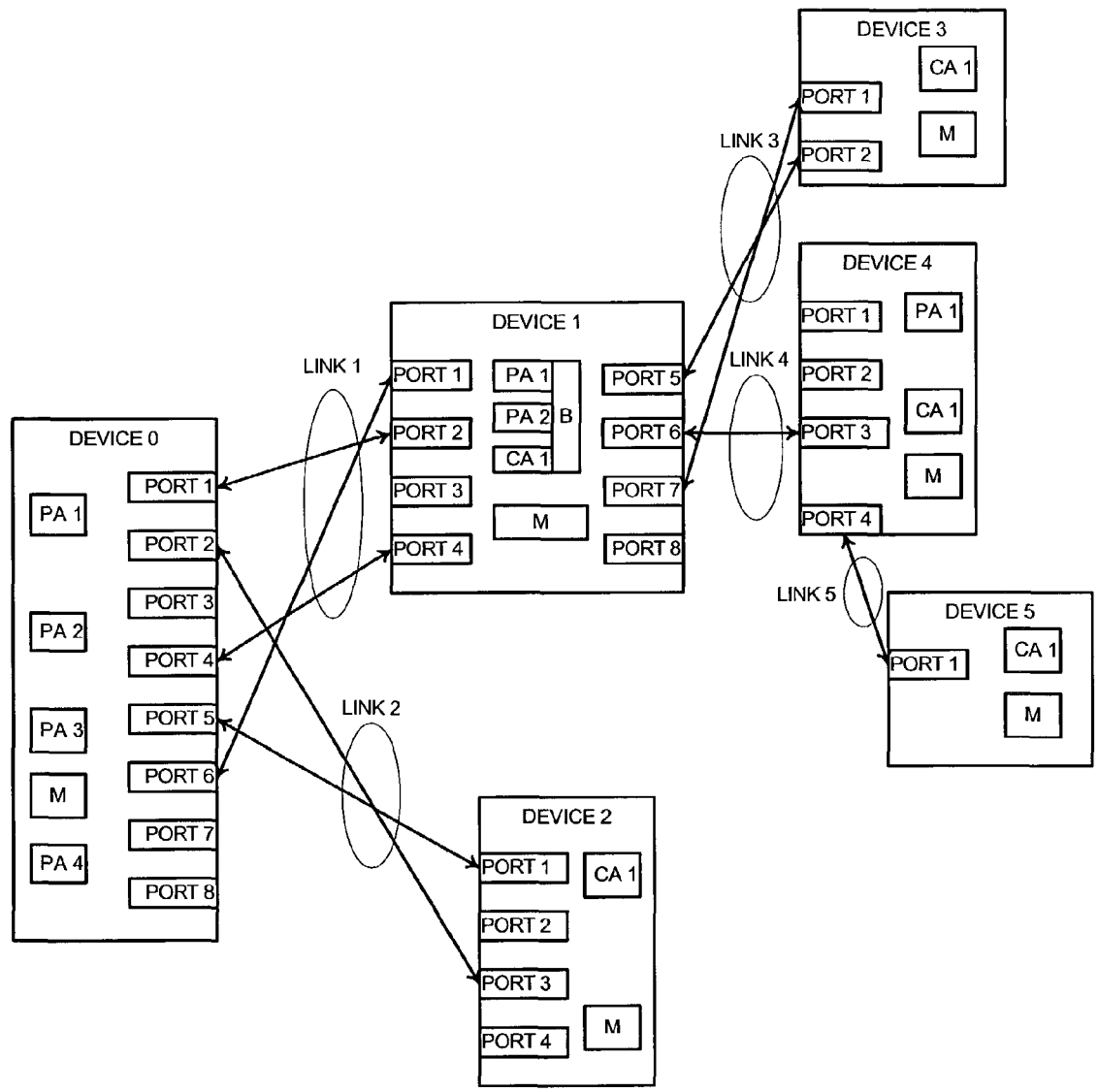
FIG. 2 illustrates in more detail the device hierarchy of the computing device of FIG. 1.

As shown in FIG. 2, the device interfaces of the DEVICES 0-5 may comprise ports that provide a physical interface for establishing one or more lanes between two devices. In one embodiment, a lane comprises a set of differential signal pairs in which one pair is used for transmission and one pair is used for reception, and a port comprises transmitters, receivers, and/or transceivers to serially send and receive a bit stream via differential signal pairs of the lane. Further, a link may comprise one or more lanes which are grouped together to form a communications path between two devices.

In one embodiment, the device interface may support links having 1 to 32 lane where each lane supports bi-directional transfers of 0.250 Gigabytes per second (GB/s). Links having one lane are referred to herein to x1 links, links having two lanes are referred to herein as x2 links, and links having N lane are referred to herein as xN links. Accordingly, the device interface in such an embodiment enables links having bandwidths between 0.250 GB/s (x1 links) and 8 GB/s (x32 links) with a resolution of 0.250 GB/s (1 lane). In another embodiment, the device interface may support only a subset of the link widths. In such an embodiment, the link resolution may be more course or may be non-uniform.

The device interfaces of the DEVICES 0-5 may also support lane reordering. For example, the device interface of DEVICE 0 may support up to 4 links that may use any combination of its ports 1-8, and DEVICE 1 may support up to 3 links that may use any combination of its ports 1-8. To create a x3 link between DEVICE 0 and DEVICE 1, PORTS 6, 1, and 4 of DEVICE 0 may be respectively connected to PORTS 1 and 2 of DEVICE 1. Lane reordering may ease physical lane routing among the DEVICES 0-5. In another embodiment, only some of the devices (e.g. DEVICE 0) may provide lane reordering and the other devices (e.g. DEVICES 1-5) may provide no lane reordering or may provide lane reversal instead of lane reordering.

Figure 3:
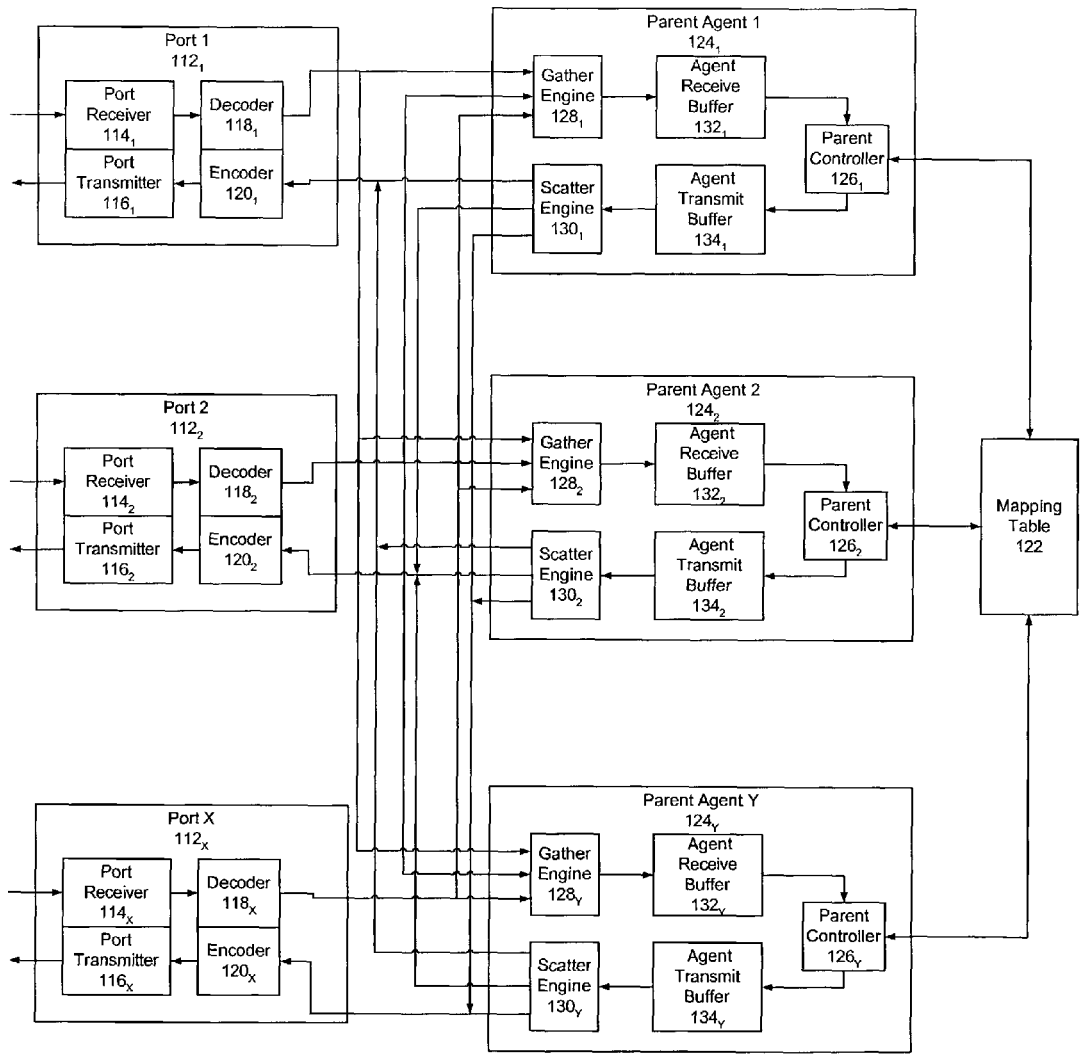
FIG. 3 illustrates an embodiment of a root interface of a root device of the device hierarchy of FIG. 2.

Referring now to FIG. 3, an embodiment of a root interface (e.g. DEVICE 0 interface) is depicted. The root interface may comprise one or more ports $112_1 \ldots 112_X$. The ports $112_1 \ldots 112_X$ may comprise port receivers $114_1 \ldots 114_X$ and port transmitters $116_1 \ldots 116_X$. In one embodiment, each port receiver $114_1 \ldots 114_X$ receives low voltage differential signals that are serially provided on a pair of receive lines, and each port transmitter $116_1 \ldots 116_X$ serially transmits low voltage differential signals on a pair of transmit lines. However, in other embodiments, the port receivers $114_1 \ldots 114_X$ and corresponding port transmitters $116_1 \ldots 116_X$ may be implemented using other signaling technologies such as, for example, optical, synchronous, source synchronous, asynchronous, etc. In another embodiment, the ports $112_1 \ldots 112_X$ may comprise port transceivers having a unified transmitter/receiver instead of separate port receivers $114_1 \ldots 114_X$ and port transmitters $116_1 \ldots 116_X$ as depicted.

The ports $112_1 \ldots 112_X$ may further comprise one or more decoders $181_1 \ldots 118_X$ to decode encoded data units or symbols received from its corresponding port receiver $114_1 \ldots 114_X$, and may also comprise one or more encoders $120_1 \ldots 120_X$ to generate encoded data units or symbols to be transmitted by its corresponding port transmitter $116_1 \ldots 116_X$. In another embodiment, the ports $112_1 \ldots 112_X$ may comprise one or more codecs that comprise a unified encoder/decoder instead of separate decoders $118_1 \ldots 118_X$ and encoders $120_1 \ldots 120_X$ as depicted. Further, the decoders $118_1 \ldots 118_X$ and the encoders $120_1 \ldots 120_X$ may comprise buffers to provide buffer storage for data units and symbols being transferred.

The decoders $118_1 \ldots 118_X$ and encoders $120_1 \ldots 120_X$ may implement the well known 8b/10b encoding scheme which is described in PCI Express Base Specification, Revision 1.0, Jul. 22, 2002 and may respectively implement scramblers and descramblers. Generally, in such an encoding scheme, the decoders $118_1 \ldots 118_X$ decode 10 bit symbols received from the port receivers $114_1 \ldots 114_X$ to obtain 8 bit data units, and the encoders $120_1 \ldots 120_X$ encode 8 bit data units to obtain 10 bit symbols to be serially transmitted by the port transmitters $116_1 \ldots 116_X$. Further, the encoders $120_1 \ldots 120_X$ may scramble the 10 bit symbols to effectively spread the transfer across a frequency spectrum to reduce generated interference, and the decoders $118_1 \ldots 118_X$ may descramble the transmitted data units to obtain the 10 bit data symbols. Other embodiments of the root device may use a different encoding/decoding scheme or may transfer data units without encoding and/or scrambling. One advantage of the 8b/10b encoding scheme is that a clock signal is effectively embedded in the symbol transmission, thus allowing symbols to be transferred without one or more separate clock signal lines between the transmitter and receiver of the symbols.

The root interface may further comprise a mapping table 122 and one or more parent agents (PA) $124_1 \ldots 124_Y$. The mapping table 122 may provide a mapping of ports $112_1 \ldots 112_X$ to links and ports of child devices. Further, the mapping table 122 may further store status information such as, for example, whether a port is connected to another port, whether a port is enabled, or whether a device has completely identified its ports. In one embodiment, the mapping table 122 comprises one or more registers of the root interface. In another embodiment, the mapping table may comprise a data structure stored in memory internal to the root interface or a data structure stored in memory external to the root interface (e.g. memory 106). In yet another embodiment, the mapping table 122 may comprise one or more registers of the parent agents $124_1 \ldots 124_Y$, or a data structure stored in memory of the parent agents $124_1 \ldots 124_Y$.

In one embodiment, each parent agent $124_1 \ldots 124_Y$ may establish a single link with a child agent (CA) of a child device such as, for example, bridge DEVICE 1 or leaf DEVICE 2 of FIG. 2. Further, in one embodiment, each link may comprise one or more of the ports $112_1 \ldots 112_X$ with any given port assigned to no more than one link. For example, since the DEVICE 0 of FIG. 2 comprises four parent agents (PA 1-4) and eight ports (PORTS 1-8), the DEVICE 0 may support up to four links and each link may comprise between one to eight ports. In particular, the DEVICE 0 may establish the following example link configurations: one x8 link; two x4 links; two x3 links and one x1 link; or three x1 links and one x5 link to name only a few supported link configurations of DEVICE 0.

The parent agents $124_1 \ldots 124_Y$ may comprise parent controllers $126_1 \ldots 126_Y$ to establish links with child agents and to control transfer of data via the data links. The parent agents $124_1 \ldots 124_Y$ may further comprise one or more gather engines $128_1 \ldots 128_Y$, one or more scatter engines $130_1 \ldots 130_Y$, one or more agent receive buffers $132_1 \ldots 132_Y$, and one or more agent transmit buffers $134_1 \ldots 134_Y$. The gather engines $128_1 \ldots 128_Y$ may reorder data units received via the ports $112_1 \ldots 112_X$ based upon port mappings indicated by the mapping table 122. The gather engines $128_1 \ldots 128_Y$ may further store the ordered data units in its corresponding agent receive buffer $132_1 \ldots 132_Y$. Conversely, the scatter engines $130_1 \ldots 130_Y$ may take ordered data units from its corresponding agent transmit buffer $134_1 \ldots 134_Y$ and stripe the data units across the ports $112_1 \ldots 112_X$ based upon port mappings indicated by the mapping table 122. In another embodiment, the root device may comprise one or more unified scatter/gather engines instead of separate gather engines $128_1 \ldots 128_Y$ and scatter engines $130_1 \ldots 130_Y$ as depicted.

In one embodiment, the ports $112_1 \ldots 112_X$ of the root interface may be coupled to ports $112_1 \ldots 112_X$ of a child interface in an arbitrary manner. Further, links may be established such that the links comprise an arbitrary number of lanes. In such an embodiment, a gather engine $128_1 \ldots 128_Y$ associated with a multi-lane link may reorder data units received via the link so that the ports of the child device may transmit data units in order. Further, the scatter engine $130_1 \ldots 130_Y$ associated with a multi-lane LINK may reorder data units to be transmitted via the link so that the ports of the child device may receive data units in order. The reordering of the data units in the parent agents $124_1 \ldots 124_Y$ may simplify the child agents of the child devices since the child agents may be implemented to simply account for skipped ports without supporting lane reordering.

Referring to FIG. 2, the first parent agent (PA 1) of DEVICE 0 may transfer via LINK 1 a packet to the first child agent (CA 1) of DEVICE 1 in the following manner. The parent controller of PA 1 may perform an in order placement of the DATA UNITS comprising the packet in the agent transmit buffer of PA 1. The scatter engine of PA 1 may retrieve the DATA UNITS 1-3 of the packet from the agent transmit buffer and may cause DATA UNIT 1, DATA UNIT 2, and DATA UNIT 3 to be respectively transmitted by PORT 6, PORT 1 and PORT 4 of DEVICE 0, thus resulting in PORT 1, PORT 2 and PORT 4 of DEVICE 1 respectively receiving DATA UNIT 1, DATA UNIT 2 and DATA UNIT 3. The scatter engine may further retrieve the DATA UNITS 4-6 of the packet from the agent transmit buffer and may cause DATA UNIT 4, DATA UNIT 5, and DATA UNIT 6 to be respectively transmitted by PORT 6, PORT 1 and PORT 4 of DEVICE 0, thus resulting in PORT 1, PORT 2 and PORT 4 of DEVICE 1 respectively receiving DATA UNIT 4, DATA UNIT 5 and DATA UNIT 6. In this manner, the PA 1 may transfer the remaining DATA UNITS 5-D of the packet to CA 1 DEVICE 1.

Similarly, the PA 1 DEVICE 0 may receive a packet comprising DATA UNITS 1-D from CA 1 DEVICE 1 in the following manner. The PORT 6, PORT 1, and PORT 4 of DEVICE 0 may respectively receive DATA UNIT 1, DATA UNIT 2, and DATA UNIT 3 from CA 1 via PORT 1, PORT 2 and PORT 4 of DEVICE 1. The gather engine of PA 1 may store in order DATA UNIT 1, DATA UNIT 2, and DATA UNIT 3 in the agent receive buffer of PA 1. The PORT 6, PORT 1, and PORT 4 of DEVICE 0 may further respectively receive DATA UNIT 4, DATA UNIT 5, and DATA UNIT 6 from CA 1 via PORT 1, PORT 2 and PORT 4 of DEVICE 1. The gather engine may store in order DATA UNIT 4, DATA UNIT 5, and DATA UNIT 6 in its corresponding agent receive buffer. In this manner, the PA 1 may receive the remaining DATA UNITS 5-D of the packet from CA 1 DEVICE 1. In one embodiment, the parent controller may then retrieve DATA UNITS of the packet in order from the agent receive buffer after all DATA UNITS of been received and stored in the agent receive buffer. In another embodiment, the parent controller may begin retrieving DATA UNITS of the packet from the agent receive buffer prior to receiving all DATA UNITS of the packet, thus supporting embodiments having agent receive buffers that are smaller than the largest possible packet.

Figure 4:
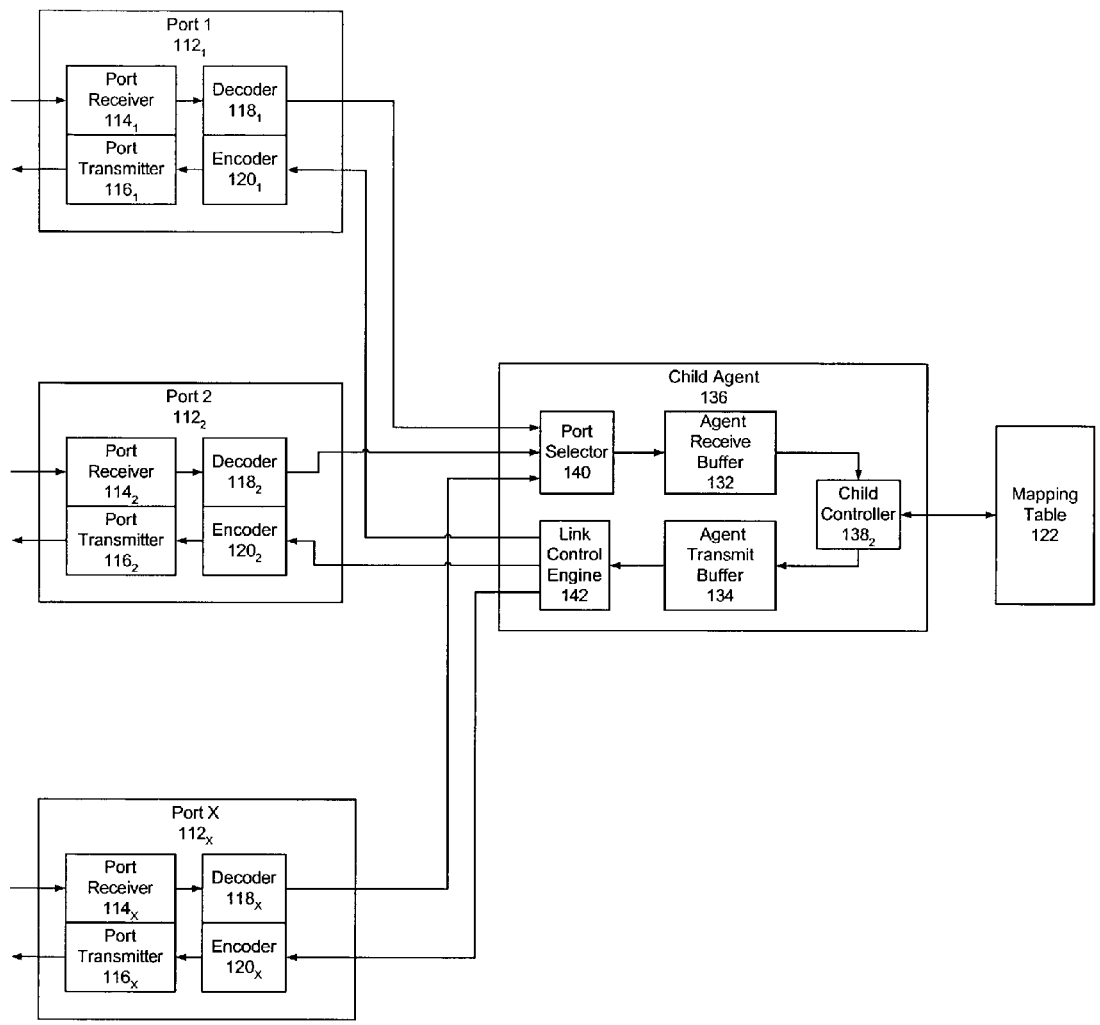
FIG. 4 illustrates an embodiment of a leaf interface of a leaf device of the device hierarchy of FIG. 2.

Referring now to FIG. 4, an embodiment of an interface of a leaf device (e.g. DEVICE 3 of FIG. 2) is depicted. The leaf interface may comprise one or more ports $112_1 \ldots 112_2$ and a mapping table 122 that may be implemented in a manner similar to corresponding portions of the root interface of FIG. 3. The leaf interface may further comprise a child agent 136. In one embodiment, the child agent 136 may establish a single link with a parent agent of a parent device such as, for example, root DEVICE 0 or bridge DEVICE 1 of FIG. 2. Further, in one embodiment, each link may comprise any one or more of the ports $112_1 \ldots 112_X$ with any given port assigned to no more than one link.

The child agent 136 may comprise a child controller 138 to establish a link with a parent device and to control data transfers over the established link. The child agent 136 may further comprise a port selector 140 and a link engine 142. The port selector 140 may select, based upon the mapping table 122, one or more ports $112_1 \ldots 112_X$ to feed its agent receive buffer 132. The port selector 140 may further control the flow of data units from the selected ports $112_1 \ldots 112_X$ to the agent receive buffer 132. Conversely, the link control engine 142 may select, based upon the mapping table 122, one or more ports $112_1 \ldots 112_X$ to feed with its agent transmit buffer 134. The link control engine 142 may further control the flow of data units from the agent transmit buffer 134 to the ports $112_1 \ldots 112_X$. In one embodiment, the port selector 140 and the link control engine 142 stripe data units of packets across the selected ports from the lowest port to the highest port of the respective link taking into account port gaps in the given link. The port selector 140 and the link control engine 142, however in one embodiment, do not reorder the data units, thus leaving data unit reordering to an upstream parent agent if such reordering is warranted.

Referring to FIG. 2, the first child agent (CA 1) of DEVICE 2 may transfer via LINK 2 a packet to the second parent agent (PA 2) of DEVICE 0 in the following manner. The child controller of CA 1 may perform an in order placement of the DATA UNITS comprising the packet in the agent transmit buffer of CA 1. The link engine of CA 1 may retrieve the DATA UNITS 1-2 from the agent transmit buffer and may cause DATA UNIT 1 and DATA UNIT 2 to be respectively transmitted by PORT 1 and PORT 3 of DEVICE 2, thus resulting in PORT 5 and PORT 2 of DEVICE 0 respectively receiving DATA UNIT 1 and DATA UNIT 2 of the packet. The link engine may further retrieve the DATA UNITS 3-4 from the agent transmit buffer and may cause DATA UNIT 3 and DATA UNIT 4 to be respectively transmitted by PORT 1 and PORT 3 of DEVICE 2, thus resulting in PORT 5 and PORT 2 of DEVICE 0 respectively receiving DATA UNIT 3 and DATA UNIT 4 of the packet. In this manner, the link engine of CA 1 may transfer the remaining DATA UNITS 5-D of the packet to PA 2 DEVICE 0.

Similarly, CA 1 DEVICE 2 may receive a packet comprising DATA UNITS 1-D from PA 2 DEVICE 0 in the following manner. The PORT 1 and PORT 3 of DEVICE 2 may respectively receive DATA UNIT 1 and DATA UNIT 2 from PA 2 via PORT 5 and PORT 2 of the DEVICE 0. The port selector of CA 1 may cause DATA UNIT 1 and DATA UNIT 2 to be respectively stored in the agent receive buffer of CA 1. The PORT 1 and PORT 3 of DEVICE 2 may further respectively receive DATA UNIT 3 and DATA UNIT 4 from PA 2 via PORT 5 and PORT 2 of the DEVICE 0. The port selector may cause DATA UNIT 3 and DATA UNIT 4 to be respectively stored in the agent receive buffer of CA 1. In this manner, CA 1 DEVICE 2 may receive the remaining DATA UNITS 5-D of the packet from PA 2 DEVICE 0. In one embodiment, the child controller of CA 1 may retrieve DATA UNITS of the packet in order from the agent receive buffer.

Figure 5:
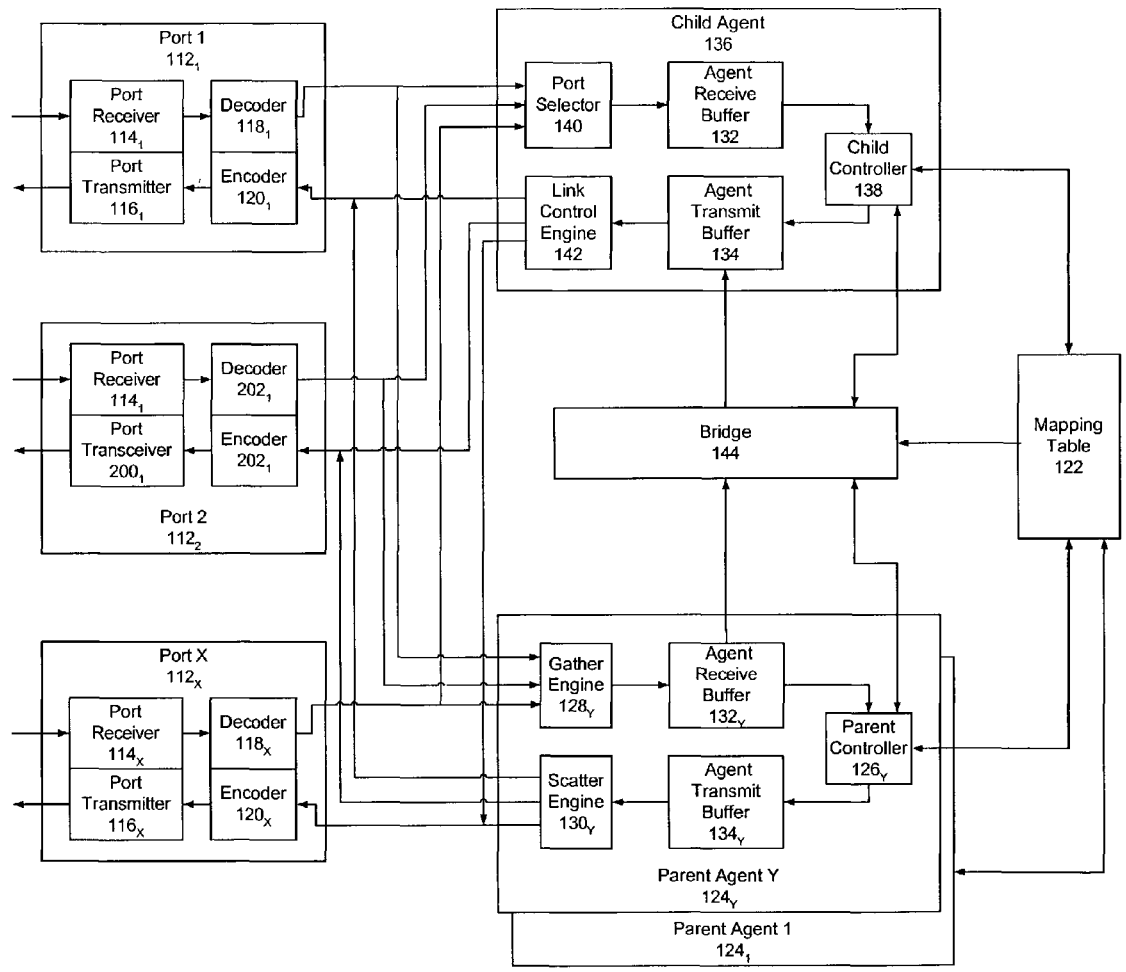
FIG. 5 illustrates an embodiment of a bridge interface of a bridge device of the device hierarchy of FIG. 2.

Referring now to FIG. 5, an embodiment of an interface of a bridge device (e.g. DEVICE 1 of FIG. 2) is depicted. The bridge interface may comprise one or more ports $112_1 \ldots 112_X$, one or more parent agents $124_1 \ldots 124_Y$, and a mapping table 122 that may be implemented in a manner similar to corresponding portions of the root interface of FIG. 3. The bridge interface may further comprise a child agent 136 that may be implemented in a manner similar to corresponding portions of the child interface of FIG. 4. Further, the bridge interface may comprise a bridge 144 between the one or more parent agents $124_1 \ldots 124_Y$ and the child agent 136 to route packets based on the mapping table 122. The bridge 144 enables packets received from a child device via a parent agent $124_1 \ldots 124_Y$ to be directed to another child device via another parent agent $124_1 \ldots 124_Y$ or to a parent device via the child agent 136 of the bridge interface. The bridge 144 further enables packets received from a parent device via the child agent 136 to be directed to a child device via one of the parent agents $124_1 \ldots 124_Y$ of the bridge interface.

Referring to FIG. 2, the child agent (CA 1) of DEVICE 3 may transfer via LINKS 1 and 3 a packet to the first parent agent (PA 1) of DEVICE 0 in the following manner. The child controller of CA 1 may perform an in order placement of the DATA UNITS comprising the packet in the agent transmit buffer of CA 1. The link engine of CA 1 may retrieve the DATA UNITS 1-2 of the packet from the agent transmit buffer and may cause DATA UNIT 1 and DATA UNIT 2 to be respectively transmitted by PORT 1 and PORT 2 of DEVICE 3, thus resulting in PA 1 DEVICE 1 respectively receiving DATA UNIT 1 and DATA UNIT 2 of the packet via PORT 7 and PORT 5 of DEVICE 1. The link engine may then retrieve the DATA UNITS 3-4 from the agent transmit buffer and may cause DATA UNIT 3 and DATA UNIT 4 to be respectively transmitted by PORT 1 and PORT 2 of DEVICE 3, thus resulting in PA 1 DEVICE 1 respectively receiving DATA UNIT 3 and DATA UNIT 4 of the packet via PORT 7 and PORT 5 of DEVICE 1. In this manner, CA 1 of DEVICE 3 may transfer the remaining DATA UNITS 5-D of the packet to PA 1 DEVICE 1 via LINK 3.

The gather engine of PA 1 DEVICE 1 may reorder the received DATA UNITS 1-D of the packet based upon the mapping table of DEVICE 1 and may place the reordered DATA UNITS 1-D in the agent receive buffer of PA 1 DEVICE 1. The parent controller of PA 1 DEVICE 1 may determine based upon address information of the received packet that the packet is directed to DEVICE 0. Accordingly, the parent controller may transfer the DATA UNITS 1-D in order to CA 1 DEVICE 1 using the bridge of DEVICE 1. CA 1 DEVICE 1 may then transfer the DATA UNITS 1-D of the packet to PA 1 DEVICE 0 via PORTS 1, 2 and 4 of LINK 1.

Similarly, CA 1 DEVICE 3 may receive a packet comprising DATA UNITS 1-D from the parent agent PA 1 DEVICE 0 in the following manner. The parent controller of PA 1 DEVICE 1 may perform an in order placement of the packet DATA UNITS in the agent transmit buffer of PA 1. The parent controller may further inform the scatter engine of PA 1 that the packet is to be transferred to DEVICE 3. Based upon the mapping table of DEVICE 0, the scatter engine determines to stripe the DATA UNITS 1-D respectively across PORT 6 and PORT 1 of DEVICE 0 since LINK 3 contains only two lanes. The scatter engine may then retrieve DATA UNITS 1-2 of the packet from the agent transmit buffer and may cause DATA UNIT 1 and DATA UNIT 2 to be respectively transmitted by PORT 6 and PORT 1 of DEVICE 0, thus resulting in CA 1 DEVICE 1 respectively receiving DATA UNIT 1 and DATA UNIT 2 of the packet via PORT 1 and PORT 2 of DEVICE 1. The scatter engine may then retrieve the DATA UNITS 3-4 from the agent transmit buffer and may cause DATA UNIT 3 and DATA UNIT 4 to be respectively transmitted by PORT 1 and PORT 2 of DEVICE 0, thus resulting in CA 1 respectively receiving DATA UNIT 3 and DATA UNIT 4 of the packet via PORT 1 and PORT 2 of DEVICE 1. In this manner, the scatter engine of the parent agent PA 1 may transfer the remaining DATA UNITS 5-D of the packet to DEVICE 1.

The port selector of CA 1 DEVICE 1 may receive DATA UNITS 1-D of the packet in order via PORT 1 and PORT 2 of DEVICE 1 and may place the received DATA UNITS 1-D in its corresponding agent receive buffer. The child controller of CA 1 DEVICE 1 may determine based upon address information of the received packet that the packet is directed to DEVICE 3. Accordingly, the child controller may transfer the DATA UNITS 1-D in order to PA 1 DEVICE 1 using the bridge of DEVICE 1. PA 1 DEVICE 1 may then transfer the packet to CA 1 DEVICE 3 by striping the DATA UNITS across PORT 7 and PORT 5 of DEVICE 1, thus resulting in CA 1 DEVICE 3 receiving the DATA UNITS in order via PORT 1 and PORT 2 of the DEVICE 3.

In one embodiment, DEVICE 1 is implemented to begin transfer of the DATA UNITS 1-D received from DEVICE 0 to DEVICE 3 prior to receiving the complete packet. Accordingly, by using the same number of lanes to transfer the packet from DEVICE 0 to DEVICE 1 as the number of lanes established in LINK 3, DEVICE 1 may be implemented with relatively small buffers since DEVICE 1 may receive the DATA UNITS from DEVICE 0 at about the same rate as DEVICE 1 may transfer the DATA UNITS to DEVICE 3. However, in other embodiments, DEVICE 0 may transfer packets to DEVICE 3 utilizing all established lanes of LINK 1 and DEVICE 1 may utilize large buffers and/or flow control mechanisms to handle bandwidth differences between bridged devices such as, for example, DEVICE 0 and DEVICE 3.

Figure 6A:
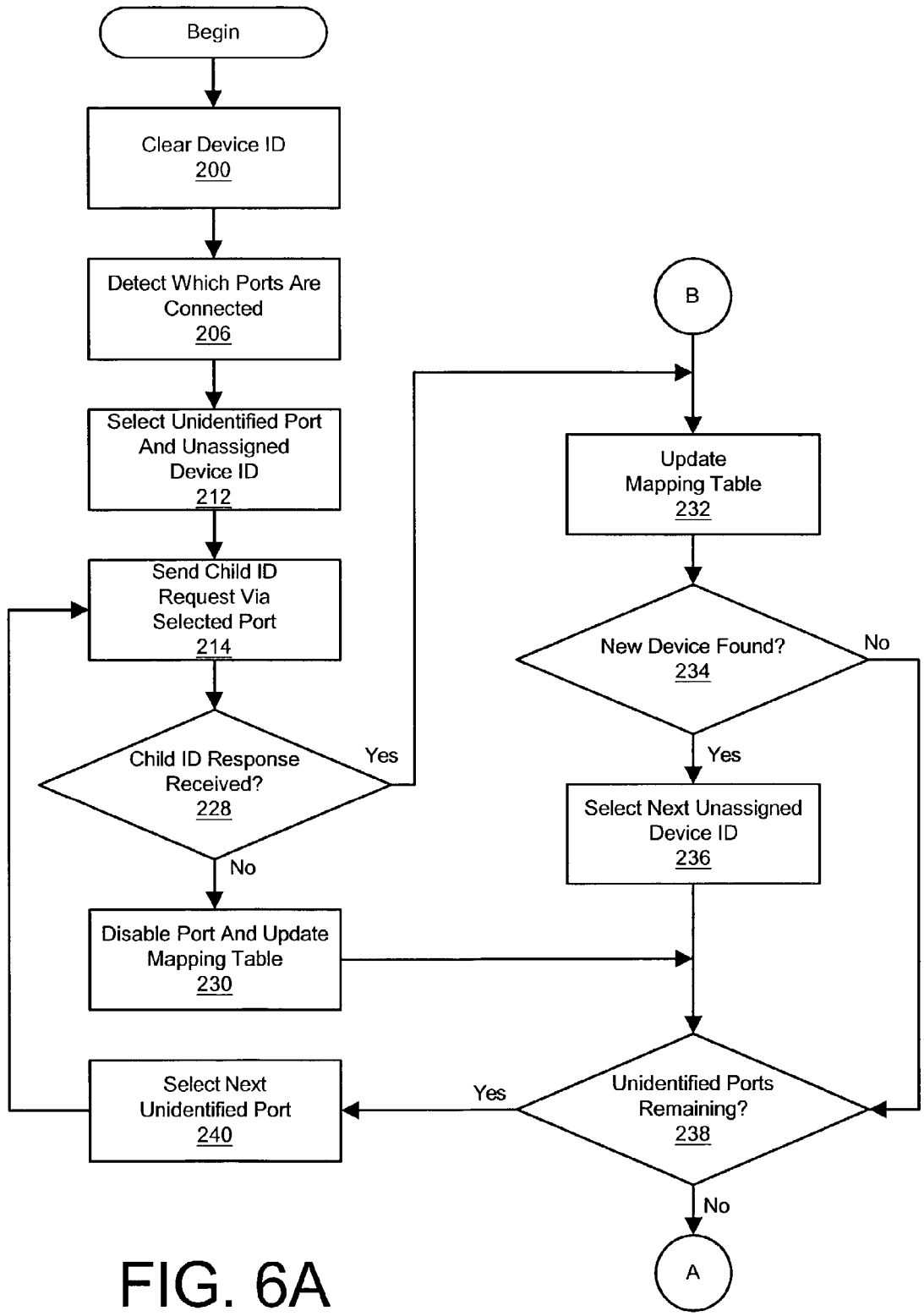
FIGS. 6A and 6B illustrate an embodiment of a port identification method of the root device of FIG. 3.
Figure 6B:
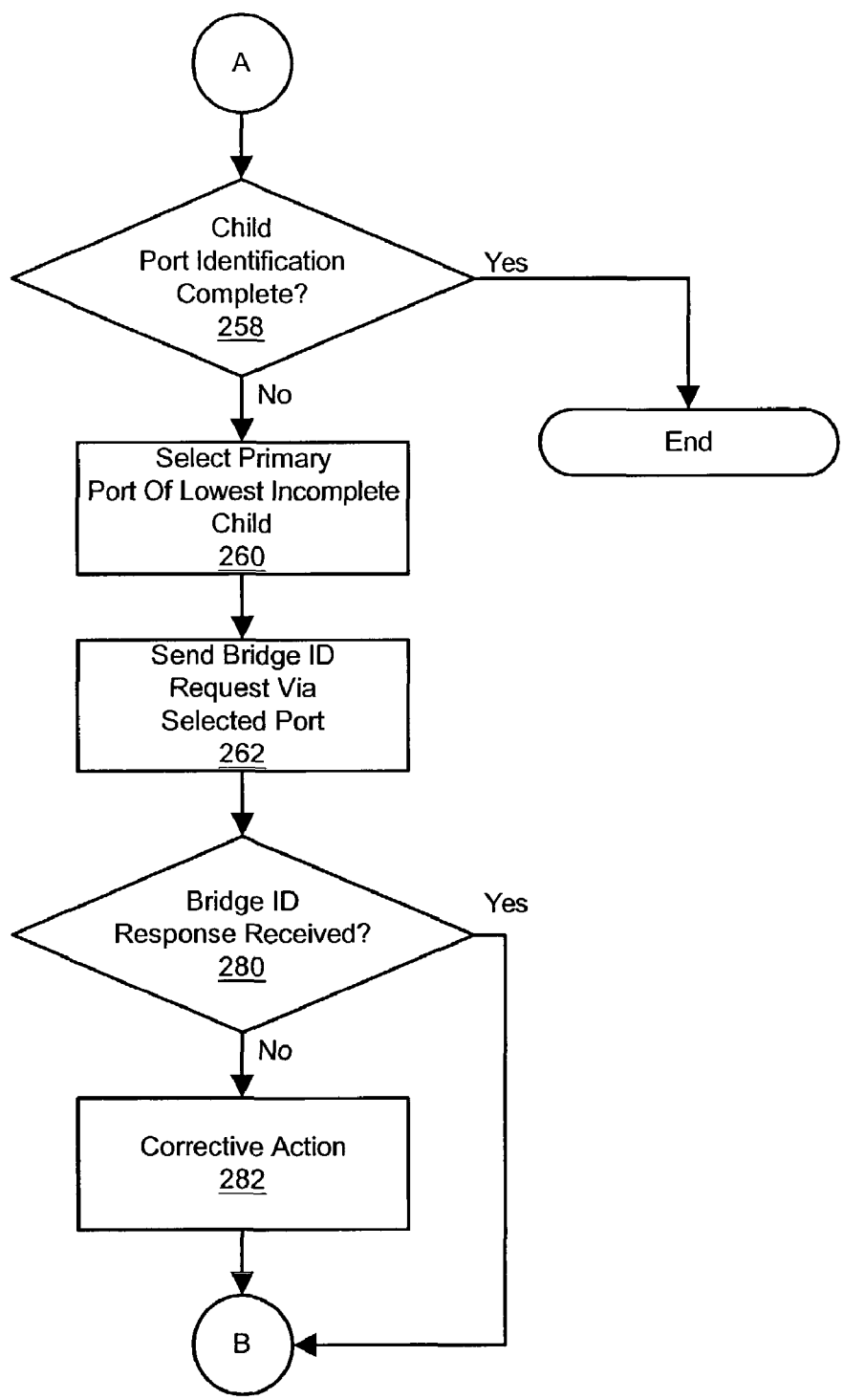
Figure 7:
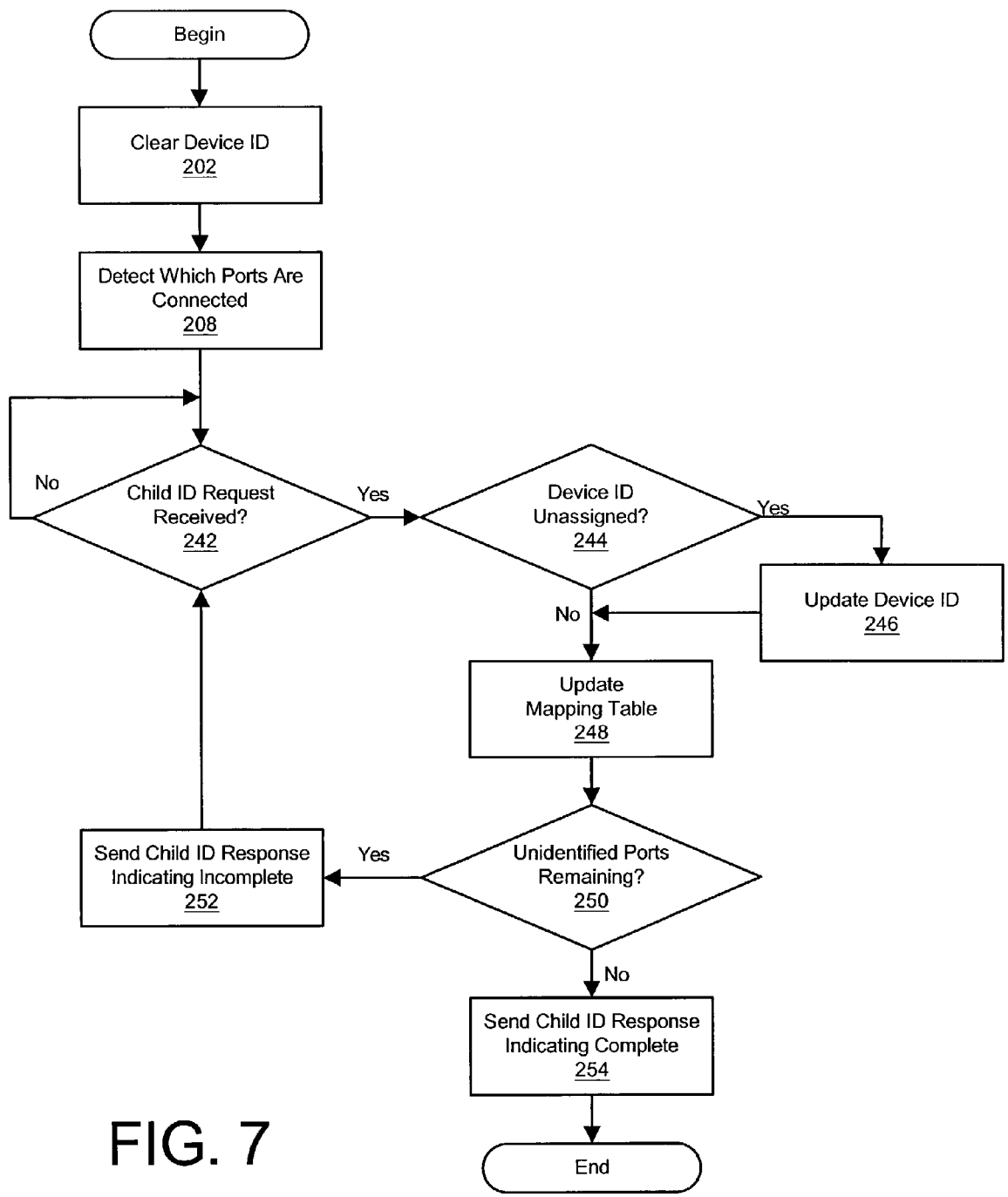
FIG. 7 illustrates an embodiment of a port identification method of a leaf device of FIG. 4.
Figure 8A:
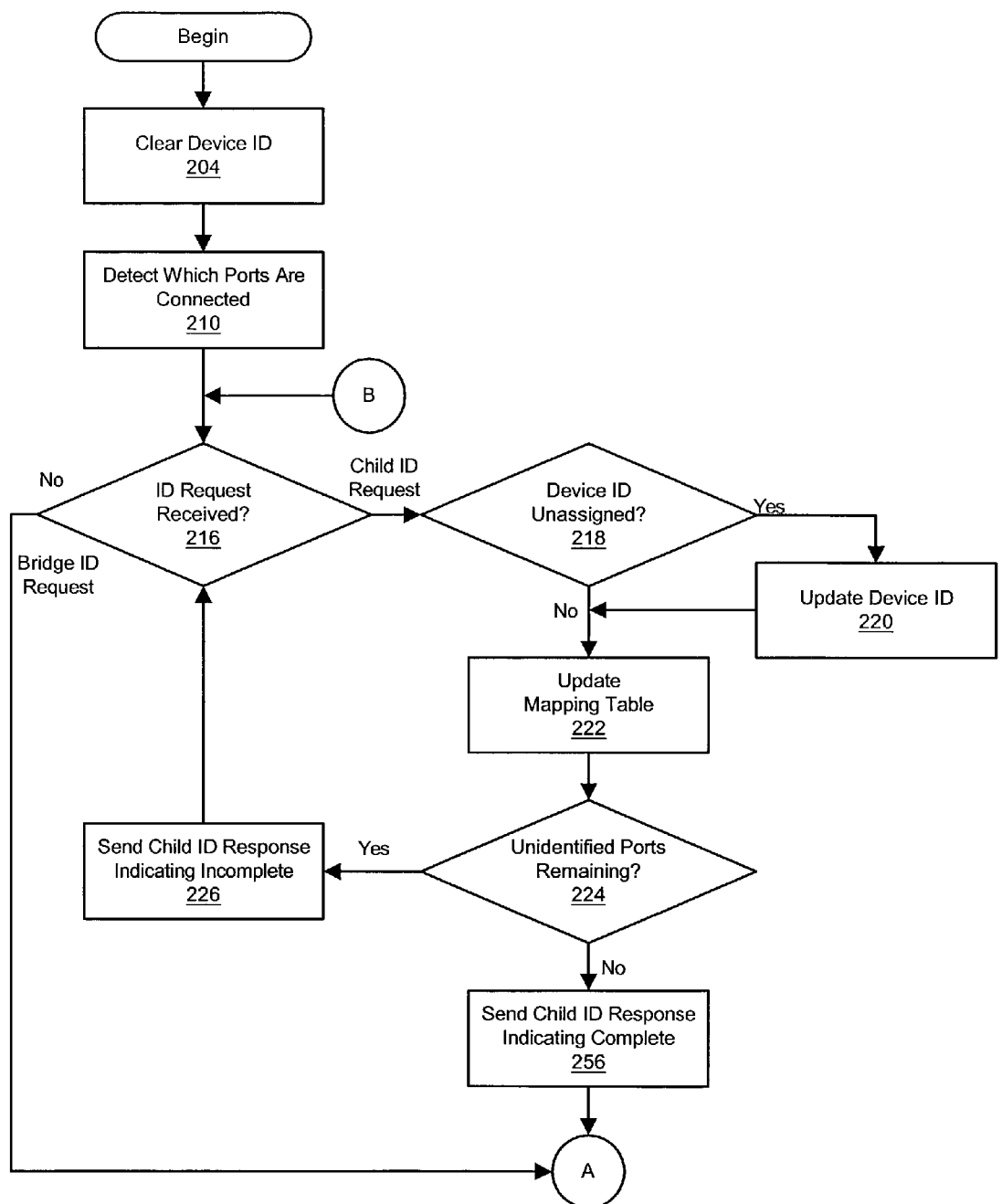
FIGS. 8A and 8B illustrate an embodiment of a port identification method of a bridge device of FIG. 5.
Figure 8B:
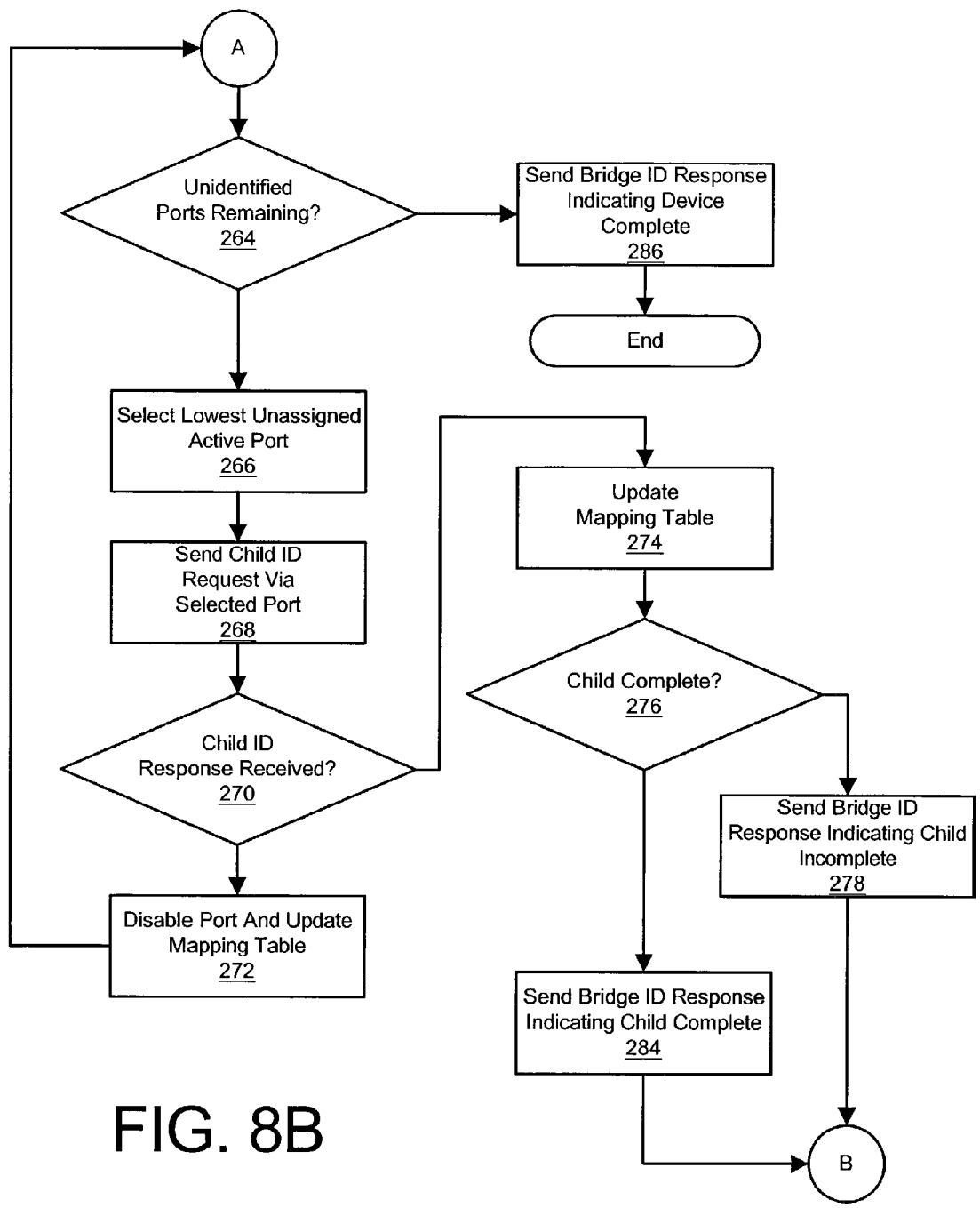

Referring now to FIGS. 6A, 6B, 7, 8A and 8B, example embodiments of port identification methods are described in the context of identifying the ports of the device hierarchy depicted in FIG. 2. In particular, FIGS. 6A and 6B illustrate a port identification method of a root interface such as the root interface of DEVICE 0 of FIG. 2. FIG. 7 illustrates a port identification method of a leaf interface such as the leaf interfaces of DEVICES 2, 3, and 5 of FIG. 2. Further, FIGS. 8A and 8B illustrate a port identification method of a bridge interface such as the bridge interfaces of DEVICES 1 and 4 of FIG. 2.

The DEVICES 0-5 begin their respective port identification methods by clearing their device identifier (ID) in blocks 200, 202, and 204. In one embodiment, the DEVICES 0-5 initiate their port identification methods in response to power on reset. However, the DEVICES 0-5 in other embodiments may initiate their port identification methods in response to other events such as, for example, a root reset or a request to re-identify its ports. Further, in block 200, DEVICE 0 (the root device) sets its device ID to 0. In one embodiment, the device ID of DEVICE 0 may be hardwired; however, in other embodiments, the device ID of DEVICE 0 may be set by the BIOS 108, may be set by reset hardware of the DEVICE 0, or may be set by some other mechanisms.

In blocks 206, 208 and 210, each DEVICE 0-5 cycles through a presence detect and disables ports that are not connected to another device. In response to the presence detect, DEVICE 0 of FIG. 2 may disable its PORT 7 and its PORT 8, DEVICE 1 may disable its PORT 3 and its PORT 8, DEVICE 2 may disable its PORT 2 and its PORT 4, DEVICE 4 may disable its PORT 1 an its PORT 2, and DEVICE 3 and DEVICE 5 may disable none of their ports. In one embodiment, DEVICES 0-5 in blocks 206, 208 and 210 may update their respective mapping tables to indicate which ports are enabled and which ports are disabled. In block 212, DEVICE 0 selects its PORT 1 as the next unidentified port and selects DEVICE 1 as the next unidentified device. DEVICE 0 then in block 214 may send on its PORT 1 the child ID request "DEVICE 0 PORT 1 Looking for DEVICE 1".

DEVICE 1 in block 216 may determine that a child ID request was received on its PORT 2. DEVICE 1 in block 218 may determine that its device ID has not yet been assigned. In block 220, DEVICE 1 may update its device ID to "1" as requested by DEVICE 0. Further, DEVICE 1 in block 222 may update its mapping table to indicate that its PORT 2 is coupled to DEVICE 0 PORT 1 as indicated by the child ID request received from DEVICE 0. In block 224, DEVICE 1 may determine that it still has unidentified ports. Accordingly, DEVICE 1 in block 226 may send via its PORT 2 the child ID response "DEVICE 1 PORT 2 Found" which identifies DEVICE 1 PORT 2 to DEVICE 0 and indicates that port identification for DEVICE 1 is incomplete.

DEVICE 0 then in block 228 may determine that it received a child ID response on its PORT 1. In one embodiment, if DEVICE 0 had not received the child ID response on its PORT 1 before a timeout period had expired, DEVICE 0 in block 230 may have disabled PORT 1 and may have updated its mapping table to prevent further transfers on PORT 1. In block 232, DEVICE 0 may update its mapping table to indicate that its PORT 1 is connected to DEVICE 1 PORT 2 as indicated by the child ID response received from DEVICE 1. DEVICE 0 in block 234 may determine that a new device was found in response to determining that the device IDs of the child ID request and the child ID response are the same. Then, DEVICE 0 in block 236 may select DEVICE 2 as the next unidentified device. In block 238, DEVICE 0 may determine that it still has unidentified ports, and may select its PORT 2 as the next unidentified port in block 240. DEVICE 0 then in block 214 may send on its selected PORT 2 the child ID request "DEVICE 0 PORT 2 Looking for DEVICE 2".

DEVICE 2 in block 242 may determine that a child ID request was received on its PORT 3. DEVICE 2 in block 244 may determine that its device ID has not yet been assigned. In block 246, DEVICE 2 may update its device ID to "2" as requested by DEVICE 0. Further, DEVICE 2 may update its mapping table in block 248 to indicate that its PORT 3 is coupled to DEVICE 0 PORT 2 as indicated by the child ID request received from DEVICE 0. In block 250, DEVICE 2 may determine that it still has unidentified ports. Accordingly, DEVICE 2 in block 252 may send via its PORT 3 the child ID response "DEVICE 2 PORT 3 Found" which identifies DEVICE 2 PORT 3 to DEVICE 0 and indicates that port identification for DEVICE 2 is incomplete.

DEVICE 0 then in block 228 may determine that it received a child ID response on its PORT 2. In block 232, DEVICE 0 may update its mapping table to indicate that its PORT 2 is connected to DEVICE 2 PORT 3 as indicated by the child ID response received from DEVICE 2. DEVICE 0 in block 234 may determine that a new device was found in response to determining that the device IDs of the child ID request and child ID responses are the same. Then, DEVICE 0 in block 236 may select DEVICE 3 as the next unidentified device and in block 238 may determine that it still has unidentified ports. In block 240, DEVICE 0 may select its PORT 4 as the next unidentified port since PORT 3 was disabled/identified in block 206. DEVICE 0 then in block 214 may send on its PORT 4 the child ID request "DEVICE 0 PORT 4 Looking for DEVICE 3".

DEVICE 1 in block 216 may determine that a child ID request was received on its PORT 4. DEVICE 1 in block 218 may determine that its device ID has already been assigned. In block 222, DEVICE 1 may update its mapping table to indicate that its PORT 4 is coupled to DEVICE 0 PORT 4 as indicated by the child ID request received from DEVICE 0. In block 224, DEVICE 1 may determine that it still has unidentified ports. Accordingly, DEVICE 1 in block 226 may send via its PORT 4 the child ID response "DEVICE 1 PORT 4 Found" which identifies DEVICE 1 PORT 4 to DEVICE 0 and indicates that port identification for DEVICE 1 is incomplete.

DEVICE 0 then in block 228 may determine that it received a child ID response on its PORT 4. In block 232, DEVICE 0 may update its mapping table to indicate that its PORT 4 is connected to DEVICE 1 PORT 3 as indicated by the child ID response received from DEVICE 1. DEVICE 0 in block 234 may determine that a new device was not found in response to determining that the device IDs of the child ID request and the child ID response are not the same. In block 238, DEVICE 0 may determine that it still has unidentified ports and in block 240 may select its PORT 5 as the next unidentified port. DEVICE 0 then in block 214 may send on its selected PORT 5 the child ID request "DEVICE 0 PORT 5 Looking for DEVICE 3".

DEVICE 2 in block 242 may determine that a child ID request was received on its PORT 1. DEVICE 2 in block 244 may determine that its device ID has already been assigned. In block 248, DEVICE 2 may update its mapping table to indicate that its PORT 1 is coupled to DEVICE 0 PORT 5 as indicated by the child ID request received from DEVICE 0. In block 250, DEVICE 2 may determine that PORT 1 was its last unidentified port since PORT 4 was disabled/identified in block 208. DEVICE 2 in block 254 may send on its PORT 1 the child ID response "DEVICE 2 PORT 1 Found, DEVICE 2 Complete" which identifies DEVICE 2 PORT 1 to DEVICE 0 and indicates that port identification for DEVICE 2 is complete.

DEVICE 0 then in block 228 may determine that it received a child ID response on its PORT 5. In block 232, DEVICE 0 may update its mapping table to indicate that its PORT 5 is connected to DEVICE 2 PORT 1 as indicated by the child ID response received from DEVICE 2. Further, DEVICE 0 in block 232 may update its mapping table to indicate that port identification for DEVICE 2 is complete. DEVICE 0 in block 234 may determine that a new device was not found in response to determining that the device IDs of the child ID request and the child ID response are not the same. In block 238, DEVICE 0 may determine that it still has unidentified ports. Accordingly, DEVICE 0 may select its PORT 6 as the next unidentified port in block 240. DEVICE 0 then in block 214 may send on its selected PORT 6 the child ID request "DEVICE 0 PORT 6 Looking for DEVICE 3".

DEVICE 1 in block 216 may determine that a child ID request was received on its PORT 1. DEVICE 1 in block 218 may determine that its device ID has already been assigned. In block 222, DEVICE 1 may update its mapping table to indicate that its PORT 1 is coupled to DEVICE 0 PORT 6 as indicated by the child ID request received from DEVICE 0. If DEVICE 0 had no child devices attached thereto, DEVICE 1 in block 224 may have determined that it has no unidentified ports since PORTS 3, 5, 6, 7 and 8 would have been disabled/identified in block 210. DEVICE 1 in block 256 may have then sent on its PORT 1 the child ID response "DEVICE 1

PORT 1 Found, DEVICE 1 Complete" which identifies DEVICE 1 PORT 1 to DEVICE 0 and indicates that port identification for DEVICE 1 is complete. However, since DEVICE 1 has attached child devices, DEVICE 1 may determine in block 224 that it still has unidentified ports. Accordingly, DEVICE 1 in block 226 may send on its PORT 1 the child ID response "DEVICE 1 PORT 1 Found" which identifies DEVICE 1 PORT 1 to DEVICE 0 and indicates that port identification for DEVICE 1 is incomplete.

DEVICE 0 then in block 228 may determine that it received a child ID response on its PORT 6. In block 232, DEVICE 0 may update its mapping table to indicate that its PORT 6 is connected to DEVICE 1 PORT 1 as indicated by the child ID response received from DEVICE 1. DEVICE 0 in block 234 may determine that a new device was not found in response to determining that the device IDs of the child ID request and the child ID response are not the same. In block 238, DEVICE 0 may determine that PORT 6 was its last unidentified port since PORT 7 and PORT 8 were disabled/identified in block 206. In block 258, DEVICE 0 may determine based upon completion information of its mapping table that a child device has unidentified ports. In block 260, DEVICE 0 may select its PORT 6 to send a bridge ID request to DEVICE 1 PORT 1 since DEVICE 1 as indicated by the mapping table has unidentified ports. DEVICE 0 in block 262 may send on its selected PORT 6 the bridge ID request "Looking for DEVICE 3".

DEVICE 1 in block 216 may determine that a bridge ID request was received on its PORT 1. DEVICE 1 in block 264 may determine that it has unidentified ports. In block 266 may select its PORT 5 as the next unidentified port. In block 268, DEVICE 1 may send on its PORT 5 the child ID request "DEVICE 1 PORT 5 Looking for DEVICE 3".

DEVICE 3 in block 242 may determine that a child ID request was received on its PORT 2. DEVICE 3 in block 244 may determine that its device ID has not yet been assigned. In block 246, DEVICE 3 may update its device ID to "3" as requested by DEVICE 1. In block 248, DEVICE 3 may update its mapping table to indicate that its PORT 2 is coupled to DEVICE 1 PORT 5 as indicated by the child ID request received from DEVICE 1. In block 250, DEVICE 3 may determine it still has unidentified ports. Accordingly, DEVICE 3 in block 252 may send the child ID response "DEVICE 3 PORT 2 Found" which identifies DEVICE 3 PORT 2 to DEVICE 1 and indicates that port identification for DEVICE 3 is incomplete.

DEVICE 1 then in block 270 may determine that it received a child ID response on its PORT 5. In one embodiment, if DEVICE 1 had not received the child ID response on its PORT 5 before a timeout period had expired, DEVICE 1 in block 272 may have disabled its PORT 5 and updated its mapping table to prevent further transfers on its PORT 5. Further, after disabling PORT 5, DEVICE 1 may have returned to 264 to select its next unidentified port and to resend a bridge ID request to the newly selected port. In response to receiving the child ID response from DEVICE 3, DEVICE 1 in block 274 may update its mapping table to indicate that its PORT 5 is connected to DEVICE 3 PORT 2 as indicated by the child ID response received from DEVICE 3. Further, DEVICE 1 in block 276 may determine that port identification for DEVICE 3 is incomplete based on the child ID response received from DEVICE 3. Accordingly, DEVICE 1 in block 278 may send the bridge ID response "DEVICE 3 PORT 2 Connected to DEVICE 1 PORT 5" which identifies DEVICE 3 PORT 2 to DEVICE 0 and indicates that port identification for DEVICE 3 is incomplete.

DEVICE 0 then in block 280 may determine that it received a bridge ID response on its PORT 1. In one embodiment, if DEVICE 0 had not received the bridge ID response on its PORT 1 before a timeout period had expired, DEVICE 0 in block 282 may have taken corrective measures such as, for example, resending the previous bridge ID message, marking DEVICE 1 as complete, forcing a reset condition to restart the port identification process, and/or signaling an error condition which the operating system and/or BIOS 108 may handle. In block 232, DEVICE 0 may update its mapping table to indicate that DEVICE 3 PORT 2 is connected to DEVICE 1 PORT 5 as indicated by the bridge ID response received from DEVICE 1. DEVICE 0 in block 234 may determine that a new device was found in response to determining that the device IDs of the bridge ID request and the bridge ID response are the same. Then, DEVICE 0 in block 236 may select DEVICE 4 as the next unidentified device. DEVICE 0 in block 238 may determine that it has no unidentified ports. Accordingly, in block 258, DEVICE 0 may determine based upon completion information of its mapping table that a child device has unidentified ports. In block 260, DEVICE 0 may select its PORT 6 to send a bridge ID request to DEVICE 1 PORT 1 since DEVICE 1 as indicated by the mapping table has unidentified ports. DEVICE 0 in block 262 then may send on its selected PORT 6 the bridge ID request "Looking for DEVICE 4".

DEVICE 1 in block 216 may determine that a bridge ID request was received on its PORT 1. DEVICE 1 in block 264 may determine that it has unidentified ports. In block 266, DEVICE 1 may select its PORT 6 as the next unidentified port. DEVICE 1 in block 268 may send on its PORT 6 the child ID request "DEVICE 1 PORT 6 Looking for DEVICE 4".

DEVICE 4 in block 216 may determine that a child ID request was received on its PORT 3. DEVICE 4 in block 218 may determine that its device ID has not yet been assigned. In block 220, DEVICE 4 may update its device ID to "4" as requested by DEVICE 1. DEVICE 4 in block 222 may update its mapping table to indicate that its PORT 3 is coupled to DEVICE 1 PORT 6 as indicated by the child ID request received from DEVICE 1. In block 224, DEVICE 4 may determine that it still has unidentified ports. Accordingly, DEVICE 4 in block 226 may send on its PORT 3 the child ID response "DEVICE 4 PORT 3 Found" which identifies DEVICE 4 PORT 3 to DEVICE 1 and indicates that port identification for DEVICE 4 is incomplete.

DEVICE 1 then in block 270 may determine that it received a child ID response on its PORT 6. In block 274, DEVICE 1 may update its mapping table to indicate that its PORT 6 is connected to DEVICE 4 PORT 3 as indicated by the child ID response received from DEVICE 4. In response to the child ID response received from DEVICE 4, DEVICE 1 in block 276 may determine that DEVICE 4 still has unidentified ports. In block 278, DEVICE 1 may send DEVICE 0 via its PORT 1 the bridge ID response "DEVICE 4 PORT 3 Connected to DEVICE 1 PORT 6" which identifies DEVICE 4 PORT 3 to DEVICE 0 and indicates that port identification for DEVICE 4 is incomplete.

DEVICE 0 then in block 280 may determine that it received a bridge ID response on its PORT 1. In block 232, DEVICE 0 may update its mapping table to indicate that DEVICE 4 PORT 3 is connected to DEVICE 1 PORT 6 as indicated by the bridge ID response received from DEVICE 1. DEVICE 0 in block 234 may determine that a new device was found in response to determining that the device IDs of the bridge ID request and the bridge ID response are the same. Accordingly, DEVICE 0 in block 236 may select DEVICE 5 as the next unidentified device. In block 238, DEVICE 0 may determine that it has no unidentified ports. In block 258, DEVICE 0 may determine based upon completion information of its mapping table that a child device has unidentified ports. In block 260, DEVICE 0 may select its PORT 6 to send a bridge ID request to DEVICE 1 PORT 1 since DEVICE 1 as indicated by the mapping table has unidentified ports. DEVICE 0 in block 262 may send on its selected PORT 6 the bridge ID request "Looking for DEVICE 5".

DEVICE 1 in block 216 may determine that a bridge ID request was received on its PORT 1. DEVICE 1 in block 264 may determine that it has unidentified ports. In block 266, DEVICE 1 may select its PORT 7 as the next unidentified port. DEVICE 1 in block 268 may send on its PORT 7 the child ID request "DEVICE 1 PORT 7 Looking for DEVICE 5".

DEVICE 3 in block 242 may determine that a child ID request was received on its PORT 1. DEVICE 3 in block 244 may determine that its device ID has already been assigned. In block 248, DEVICE 3 may update its mapping table to indicate that its PORT 1 is coupled to DEVICE 1 PORT 7 as indicated by the child ID request received from DEVICE 1. In block 250, DEVICE 3 may determine that PORT 1 was its last unidentified port. Accordingly, DEVICE 3 in block 254 may send on its PORT 1 the child ID response "DEVICE 3 PORT 1 Found, DEVICE 3 Complete" which identifies DEVICE 3 PORT 1 to DEVICE 1 and indicates that port identification for DEVICE 3 is complete.

DEVICE 1 then in block 270 may determine that it received a child ID response on its PORT 7. In block 274, DEVICE 1 may update its mapping table to indicate that its PORT 7 is connected to DEVICE 3 PORT 1 as indicated by the child ID response received from DEVICE 3. In response to the child ID response received from DEVICE 3, DEVICE 1 in block 276 may determine that DEVICE 3 still has no unidentified ports. In block 284, DEVICE 1 may send the bridge ID response "DEVICE 3 PORT 1 Connected to DEVICE 1 PORT 7, DEVICE 3 Complete".

DEVICE 0 then in block 280 may determine that it received a bridge ID response on its PORT 1. In block 232, DEVICE 0 may update its mapping table to indicate that DEVICE 3 PORT 1 is connected to DEVICE 1 PORT 7 as indicated by the bridge ID response received from DEVICE 1. DEVICE 0 in block 234 may determine that a new device was not found in response to determining that the device IDs of the bridge ID request and the bridge ID response are not the same. In block 238, DEVICE 0 may determine that it has no unidentified ports. In block 258, DEVICE 0 may determine based upon completion information of its mapping table that a child device has unidentified ports. In block 260, DEVICE 0 may select its PORT 6 to send a bridge ID request to DEVICE 1 PORT 1 since DEVICE 1 as indicated by the mapping table has unidentified ports. DEVICE 0 in block 262 may send on its selected PORT 6 the bridge ID request "Looking for DEVICE 5".

DEVICE 1 in block 216 may determine that a bridge ID request was received on its PORT 1. DEVICE 1 in block 264 may determine that it has no unidentified ports since PORT 8 was disabled/identified in 206. Accordingly, DEVICE 1 in block 284 may send the bridge ID response "DEVICE 1 Complete" which indicates that port identification for DEVICE 1 is complete.

DEVICE 0 then in block 280 may determine that it received a bridge ID response on its PORT 1. In block 232, DEVICE 0 may update its mapping table to indicate that port identification for DEVICE 1 is complete. DEVICE 0 in block 234 may determine that a new device was not found in response to determining that the device IDs of the bridge ID request and the bridge ID response are not the same. In block 238, DEVICE 0 may determine that it has no unidentified ports. In block 258, DEVICE 0 may determine based upon completion information of its mapping table that a child device has unidentified ports. In block 260, DEVICE 0 may select its PORT 6 to send a bridge ID request to DEVICE 4 via DEVICE 1 PORT 1 since DEVICE 4 as indicated by the mapping table has unidentified ports. DEVICE 0 in block 262 may send to DEVICE 4 via its selected PORT 6 the bridge ID request "Looking for DEVICE 5" thus causing DEVICE 1 to route the bridge ID request to DEVICE 4 based upon the DEVICE 1 mapping table and the address information of the bridge ID request.

DEVICE 4 in block 216 may determine that a bridge ID request was received on its PORT 1. DEVICE 4 in block 264 may determine that it has unidentified ports. In block 266, DEVICE 4 may select its PORT 4 as the next unidentified port. DEVICE 4 in block 268 may send on its PORT 4 the child ID request "DEVICE 4 PORT 4 Looking for DEVICE 5".

DEVICE 5 in block 242 may determine that a child ID request was received on its PORT 1. DEVICE 5 in block 244 may determine that its device ID has not yet been assigned. In block 246, DEVICE 5 may update its device ID to "5" as requested by DEVICE 1. In block 248, DEVICE 5 may update its mapping table to indicate that its PORT 1 is coupled to DEVICE 4 PORT 4 as indicated by the child ID request received from DEVICE 4. In block 250, DEVICE 5 may determine that its PORT 1 was the last unidentified port. Accordingly, DEVICE 5 in block 254 may send via its PORT 1 the child ID response "DEVICE 5 PORT 1 Found, DEVICE 5 Complete" which identifies DEVICE 5 PORT 1 to DEVICE 4 and indicates that port identification for DEVICE 5 is complete.

DEVICE 4 then in block 270 may determine that it received a child ID response on its PORT 4. In block 274, DEVICE 4 may update its mapping table to indicate that its PORT 4 is connected to DEVICE 5 PORT 1 as indicated by the child ID response received from DEVICE 5. In response to the child ID response received from DEVICE 5, DEVICE 4 in block 276 may determine that DEVICE 5 has no unidentified ports. In block 284, DEVICE 4 may send to DEVICE 0 via its PORT 1 and DEVICE 1 the bridge ID response "DEVICE 5 PORT 1 Connected to DEVICE 4 PORT 4, DEVICE 5 Complete".

DEVICE 0 then in block 280 may determine that it received a bridge ID response on its PORT 6. In block 232, DEVICE 0 may update its mapping table to indicate that DEVICE 5 PORT 1 is connected to DEVICE 4 PORT 4 as indicated by the bridge ID response received from DEVICE 4 via DEVICE 1. DEVICE 0 in block 234 may determine that a new device was found in response to determining that the device IDs of the bridge ID request and the bridge ID response are the same. Accordingly, DEVICE 0 in block 236 may select DEVICE 6 as the next unidentified device. In block 238, DEVICE 0 may determine that it has no unidentified ports. In block 258, DEVICE 0 may determine based upon completion information of its mapping table that a child device has unidentified ports. In block 260, DEVICE 0 may select its PORT 6 to send a bridge ID request to DEVICE 4 via DEVICE 1 PORT 1 since DEVICE 4 as indicated by the mapping table has unidentified ports. DEVICE 0 in block 262 may send on its selected PORT 6 the bridge ID request "Looking for DEVICE 6" thus causing the bridge ID request to be delivered to DEVICE 4 via DEVICE 1.

DEVICE 4 in block 216 may determine that a bridge ID request was received on its PORT 1. DEVICE 4 in block 264 may determine that it has no unidentified ports. Accordingly, DEVICE 4 in block 284 may send to DEVICE 0 via DEVICE 1 the bridge ID response "DEVICE 4 Complete" which indicates that port identification for DEVICE 4 is complete.

DEVICE 0 then in block 280 may determine that it received a bridge ID response on its PORT 6. In block 232, DEVICE 0 may update its mapping table to indicate that port identification for DEVICE 4 is complete. DEVICE 0 in block 234 may determine that a new device was not found in response to determining that device IDs of the bridge ID request and the bridge ID response are not the same. In block 238, DEVICE 0 may determine that it has no unidentified ports. In block 258, DEVICE 0 may determine based upon completion information of its mapping table that no child device has unidentified ports.

At this point, port identification is complete and lanes of the links between the DEVICES 0-5 are defined. In particular, LINK 1 consists of three lanes, LINK 2 consists of two lane, LINK 3 consists of two lanes, LINK 4 consists of one lane, and LINK 5 consists of one lane. The above embodiments enable a system designer to route signal lines between ports with minimal limitations imposed by the location of the device ports. In general, the system designer may simply interconnect ports in a manner that eases physical routing and allow the port identification methods of the devices discover/identify the port connections. Further, the port identification methods provide the system designer with fine grain control of bandwidth between devices by allowing the system designer to assign lanes to links on a per lane basis.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention. Further, the use of the terms "first", "second", "third" etc. in the appended claims merely provide labels to distinguish between elements and are not intended to import an ordering of such elements.

What is claimed is:

1. A device comprising:
    a plurality of ports comprising a first port, a second port, a third port, and a fourth port to serially transmit symbols over lanes of a plurality of links and to serially receive symbols from lanes of the plurality of links,
    a mapping table coupled to the plurality of ports, wherein the mapping table is to provide control information including port mappings and lane order to support assignment of any combination of the plurality of ports to any link of the plurality of links, and
    a plurality of agents coupled to the plurality of ports, a first agent of the plurality of agents further comprises,
    a first scatter engine to provide symbols for serial transmission to the plurality of ports associated with lanes of a first link in a first lane order indicated by the mapping table, and
    a first gather engine to reorder symbols serially received over the plurality of ports based upon port mappings indicated by the mapping table and,
    wherein the plurality of agents are to control the plurality of links and support assignment of any combination of the plurality of ports to any link of the plurality of links.

2. The device of claim 1 wherein the plurality of agents support defining lanes between any port of the plurality of ports to any port of another device.

3. The device of claim 1 wherein the plurality of agents determine lane ordering of each link of the plurality of links and cause the plurality of ports to serially transmit symbols in a manner that accounts for the lane ordering of the respective link.

4. The device of claim 1 wherein the plurality of agents determine lane ordering of each link of the plurality of links by transmitting identifier requests via each port of the plurality of ports.

5. The device of claim 1 wherein the plurality of agents disable each port of the plurality of ports that is not connected to a port of another device and determine lane ordering of each link of the plurality of links by transmitting identifier requests via each enabled port of the plurality of ports.

6. The device of claim 1 wherein the plurality of agents determine lane ordering of each link of the plurality of links based upon identifier requests received via the plurality of ports.

7. A device comprising
    a plurality of ports comprising a first port, a second port, a third port and a fourth port to serially transmit and receive data over links to other devices,
    a mapping table to associate any permutation of the plurality of ports to the links,
    a first scatter engine to provide data units to ports associated with lanes of a first link in a first lane order indicated by the mapping table, and
    a second scatter engine to provide data units to ports associated with lanes of a second link in a second lane order indicated by the mapping table.

8. The device of claim 7 further comprising a first gather engine to order data units received across ports of the first link based upon the first lane order of the mapping table.

9. The device of claim 7 further comprising a second gather engine to order data units received across ports of the second link based upon the second lane order of the mapping table.

10. The device of claim 9 wherein the mapping table defines the first lane ordering and the second lane ordering by mapping the plurality of ports to ports of the other devices.

11. The device of claim 7 wherein the first scatter engine is to support any port of the plurality of ports being mapped to the first link and is to support any ordering of the ports mapped to the first link.

12. The device of claim 7 wherein the plurality of ports comprises more than two ports and the scatter engine supports any subset of the plurality of ports to be mapped to the first link.

13. A machine readable medium comprising a plurality of instructions that, in response to being executing, result in a computing device,
    issuing a first request on a first port of a first device that identifies the first device and the first port of the first device,
    receiving the first request on a first port of a second device,
    issuing, on the first port of the second device, a first response to the first request that identifies the second device and the first port of the second device,
    receiving, on the first port of the first device, the first response to the first request,
    updating a mapping table to indicate that a first lane exists between the first port of the first device and the first port of the second device in response to the first device receiving the first response,
    issuing a bridge request on the first port of the first device,
    receiving the bridge request on the first port of the second device, issuing a second request on a second port of the second device that identifies the second device and the second port of the second device in response to the second device receiving the bridge request, receiving the second request on a first port of a third device, issuing, on the first port of the third device, a second response to the second request that identifies the third device and the first port of the third device, receiving, on the second port of the second device, the second response to the second request, and issuing, on the first port of the second device, a bridge response to the bridge request that identifies second port of the second device is connected to the first port of the third device, and updating the mapping table to indicate that the second lane exists between the second port of the second device and the first port of the third device in response to the first device receiving the bridge request.

14. The computer readable medium of claim 13, wherein the plurality of instructions, in response to being executed, result in the computing device issuing third request on a second port of the first device that identifies the first device and the second port of the first device, receiving the third request on a third port of the second device, issuing, on the third port of the second device, a third response to the third request that identifies the second device and the third port of the second device, receiving, on the second port of the first device, the third response to the third request, and updating the mapping table to indicate that a third lane exists between the second port of the first device and the third port of the second device in response to the first device receiving the third response.

15. The computer readable medium of claim 14, wherein the plurality of instructions, in response to being executed, result in the computing device defining a link between the first device and the second device to include the first lane and the third lane, and defining a link between the second device and the third device to include the second lane.

16. A system comprising a first device comprising at least a first port, a second port, a third port and a fourth port to transfer data units, a second device comprising ports to transfer data units, a third device comprising ports to transfer data units, first lanes interconnecting one or more ports of the first device with ports of the second device to form a first link between the first device and the second device, and second lanes interconnecting one or more ports of the first device with ports of the third device to form a second link between the first device and the third device, the first device further comprises, a mapping table to associate any permutation of a first plurality of ports to the first link and any permutation of a second plurality of ports to the second link, a first scatter engine to provide data units to the first plurality of ports associated with the first lanes of the first link in a first lane order indicated by the mapping table, and a second scatter engine to provide data units to the second plurality of ports associated with second lanes of the second link in a second lane order indicated by the mapping table.

17. The system of claim 16 the first device further comprises a transmit buffer, wherein the first scatter engine is to retrieve the data units from the transmit buffer before scattering the data across the first lanes such that ports of the second device receive the data units via a predefined ordering of the ports of the second device.

18. The system of claim 16 wherein the first device comprises, a gather engine to generate the data units in order by reordering the data units received from the second device over the first link, a receive buffer to store data units in order, and a controller to retrieve the data units from the receive buffer before providing the data units in a predefined order to the first device for further processing.

19. The system of claim 16, wherein the ports of the first device comprise encoders to generate symbols to transmit and decoders to decode received symbols, and the ports of the second device comprise encoders to generate symbols to transmit and decoders to decode received symbols.

20. A method in a network device, comprising:

storing control information including port mappings and lane order in a mapping table to support assignment of any combination of a plurality of ports to any link of a plurality of links, serially transmitting symbols over lanes of the plurality of links, wherein symbols are transmitted over the plurality of ports associated with the lanes of a first link in a first lane order indicated by the port mappings, serially receiving symbols from lanes of the plurality of links and reordering the symbols received over the lanes coupled to a plurality of ports based upon port mappings indicated by the port mappings, and controlling the plurality of links and supporting assignment of any combination of the plurality of ports to any link of the plurality of links;

wherein the mapping table is coupled to the plurality of ports, wherein the mapping table is to provide control information including port mappings and lane order to support assignment of any combination of the plurality of ports to any link of the plurality of links, and a plurality of agents coupled to the plurality of ports, a first agent of the plurality of agents further comprises, a first scatter engine to provide symbols for serial transmission to the plurality of ports associated with lanes of a first link in a first lane order indicated by the mapping table, and a first, gather engine to reorder symbols serially received over the plurality of ports based upon port mappings indicated by the mapping table.

21. The method of claim 20 further comprises defining lanes between any port of the plurality of ports to any port of another device.

22. The method of claim 20 further comprises, determining lane ordering of each link of the plurality of links, and causing the plurality of ports to serially transmit symbols in a manner that accounts for the lane ordering of the respective link.

23. The method of claim 22 comprises determining the lane ordering of each link of the plurality of links by transmitting identifier requests via each port of the plurality of ports.

24. The method of claim 22 comprises determining the lane ordering of each link of the plurality of links based upon identifier requests received via the plurality of ports.

25. The method of claim 20 further comprises disabling each port of the plurality of ports that is not connected to a port of another device and determine lane ordering of each link of the plurality of links by transmitting identifier requests via each enabled port of the plurality of ports.

26. A method in a network device, comprising:

storing mappings that indicate associations of any permutation of the plurality of ports to the links, serially transmitting data units over a link from a plurality of ports of the network device to other devices, receiving data units over links from the other devices over the plurality of ports of the network device, wherein the plurality of ports are coupled to the links, and wherein the data units are provided by a first scatter engine to the plurality of ports associated with lanes of a first link in a first lane order indicated by the mappings, and wherein the data units are provided by a second scatter engine to the plurality of ports associated with lanes of a second link in a second lane order indicated by the mapping table;

wherein the mapping table is coupled to the plurality of ports, wherein the mapping table is to provide control information including port mappings and lane order to support assignment of any combination of the plurality of ports to any link of the plurality of links, and a plurality of agents coupled to the plurality of ports, a first agent of the plurality of agents further comprises, a first scatter engine to provide symbols for serial transmission to the plurality of ports associated with lanes of a first link in a first lane order indicated by the mapping table, and a first, gather engine to reorder symbols serially received over the plurality of ports based upon port mappings indicated by the mapping table.

27. The method of claim 26 further comprises ordering data units received across the plurality of ports of the first link based upon the first lane order before the first scatter engine provides the data units to the plurality of ports.

28. The method of claim 26 further comprises ordering data units received across the plurality of ports of the second link based upon the second lane order before the second scatter engine provides the data units to the plurality of ports.

29. The method of claim 26 further comprises defining the first lane ordering and the second lane ordering in the mappings by mapping the plurality of ports of the network device to ports of the other devices.

30. The method of claim 26 further comprises supporting any port of the plurality of ports being mapped to the first link and any ordering of the plurality of ports mapped to the first link.

* * * * *